US010112736B2

(12) United States Patent
Kanno

(10) Patent No.: US 10,112,736 B2
(45) Date of Patent: Oct. 30, 2018

(54) WINDING DEVICE AND CUTOFF DETECTION METHOD

(71) Applicant: Oki Data Corporation, Tokyo (JP)

(72) Inventor: Shunichi Kanno, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/384,261

(22) Filed: Dec. 19, 2016

(65) Prior Publication Data

US 2017/0217623 A1 Aug. 3, 2017

(30) Foreign Application Priority Data

Jan. 28, 2016 (JP) ................................ 2016-013970

(51) Int. Cl.

*B32B 41/00* (2006.01)
*B65C 9/00* (2006.01)
*B65H 18/08* (2006.01)
*B65H 26/00* (2006.01)
*B31D 1/02* (2006.01)
*B65H 26/02* (2006.01)
*B65H 18/10* (2006.01)

(52) U.S. Cl.

CPC .................. *B65C 9/00* (2013.01); *B31D 1/02* (2013.01); *B65H 18/08* (2013.01); *B65H 18/103* (2013.01); *B65H 26/00* (2013.01); *B65H 26/025* (2013.01); *B65C 2009/0087* (2013.01); *B65H 2701/192* (2013.01)

(58) Field of Classification Search

CPC ... B65C 9/00; B65C 2009/0087; B65H 18/08; B65H 26/00; B65H 2701/192

USPC ............................ 156/60, 64, 350, 378, 379

See application file for complete search history.

(56) References Cited

U.S. PATENT DOCUMENTS 5,235,515 A * 8/1993 Ungpiyakul ...... A61F 13/15699 156/264
2004/0019400 A1* 1/2004 Popp ................ A61F 13/15772 700/125
2006/0118229 A1* 6/2006 Ohashi ................ G06K 19/077 156/60

FOREIGN PATENT DOCUMENTS

JP 2009-023094 A 2/2009

* cited by examiner

*Primary Examiner* — Michael N Orlando
*Assistant Examiner* — Joshel Rivera
(74) *Attorney, Agent, or Firm* — Muncy, Geissler, Olds & Lowe, P.C.

(57) ABSTRACT

A winding device includes a first roller that winds label roll paper that is composed with a continues base sheet, a plurality of labels and a marginal portion, a second roller that winds the marginal portion peeled off the label roll paper, a drive part that generates a driving force for the second roller to rotate, a drive transmission control part that is provided between the drive part and the second roller such that the driving force is transmitted to the second roller from the driving part, and stops transmitting the driving force to the second roller if a load placed on the second roller exceeds a prescribed load, a detection part that detects a rotation of the second roller, and a control part that determines a cutoff of the marginal portion based on the rotation of the second roller detected by the detection part.

14 Claims, 14 Drawing Sheets

WINDING DEVICE AND CUTOFF DETECTION METHOD

CROSS REFERENCE TO RELATED APPLICATIONS

This application claims priority under 35 USC 119 to Japanese Patent Application No. 2016-013970 filed on Jan. 28, 2016, the entire contents which are incorporated herein by reference.

TECHNICAL FIELD

This invention relates to a winding device that winds a marginal portion peeled off label roll paper and a cutoff detection method for the marginal portion.

BACKGROUND

A conventional winding device removes a marginal portion that is an unnecessary part from a printed label roll paper and winds it on a margin winding part (e.g., see Patent Document 1). Also, there is one that is provided with a margin cutoff detection device utilizing a photoelectric tube and a microswitch that detect that the marginal portion is cut off and detects a cutoff of the marginal portion when performing an operation to wind the marginal portion.

RELATED ART

[Patent Doc.] JP Laid-Open Application Publication 2009-23094

However, in the conventional technology, there is a problem that the margin cutoff detection device must be modified according to the material and width of the marginal portion of the label roll paper to detect that the marginal portion is cut off, which imposes a heavy burden on its operator.

The objective this invention is to solve such problem as this and detect a cutoff of the marginal portion without imposing any burden on the operator.

SUMMARY

A winding device includes a first roller that winds label roll paper, the label roll paper being composed with a continues base sheet, a plurality of labels and a marginal portion, the labels and the marginal portion, which surrounds the labels, being peelably attached on one side of the base sheet such that the labels and the marginal portion entirely covers the one side of the base sheet, a second roller that winds the marginal portion peeled off the label roll paper, a drive part that generates a driving force for the second roller to rotate, a drive transmission control part that is provided between the drive part and the second roller such that the driving force is transmitted to the second roller from the driving part, and stops transmitting the driving force to the second roller if a load placed on the second roller exceeds a prescribed load, a detection part that detects a rotation of the second roller, and a control part that determines a cutoff of the marginal portion based on the rotation of the second roller detected by the detection part.

This invention designed in this manner allows obtaining the effect that a cutoff of the marginal portion can be detected without imposing any burden on the operator.

DETAILED DESCRIPTION OF THE PREFERRED EMBODIMENTS

Below, embodiments of the winding device and the cutoff detection method by this invention are explained referring to drawings.

Embodiment 1

Figure 1:
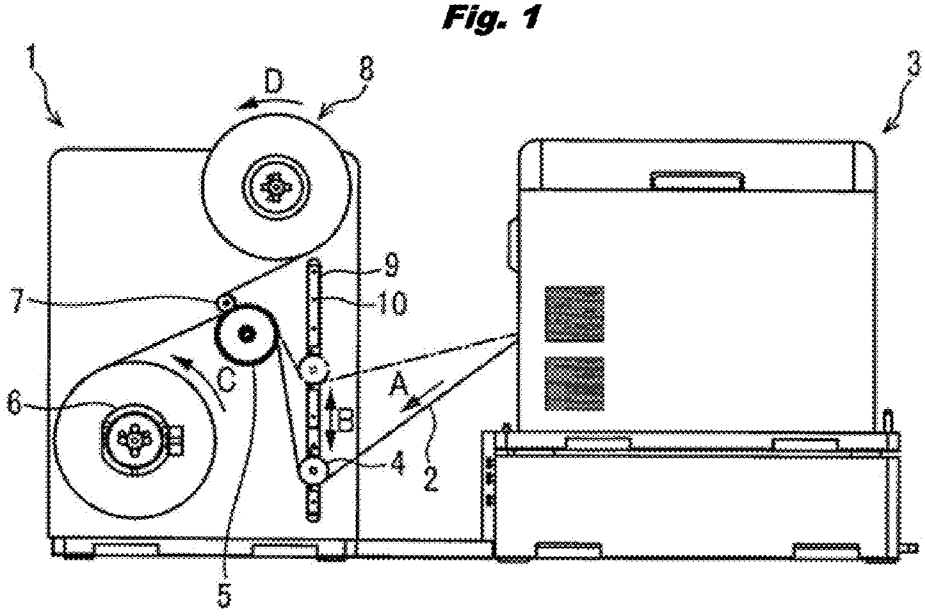
FIG. 1 is an outline front view showing the configuration of a winding device in the first embodiment.

FIG. 1 is an outline front view showing the configuration of a winding device in the first embodiment.

In FIG. 1, the winding device 1 winds label roll paper 2 printed by a printer 3. The label roll paper 2 printed by the printer 3 is ejected from an ejection port of the printer 3, carried in a label roll paper carrying direction indicated with an arrow A in the figure, and wound into a roll shape by the winding device 1. In winding the label roll paper 2, the winding device 1 performs a margin winding operation that peels a marginal portion off a base sheet of the label roll paper 2 before winding it. The labels, base sheet and marginal portion are respectively denoted with 2*a*, 2*b* and 2*c* in FIG. 6A.

Here, the label roll paper 2 is made by peelably bonding, to the base sheet, a label part that has characters and images printed by the printer 3 and the marginal portion that has no characters or images printed by the printer 3 and becomes unnecessary.

The winding device 1 comprises a tension bar 4, an idle roller 5, a winding roller 6, a peeling bar 7, a margin winding part 8, a tension bar guide 9, and tension bar sensors 10.

The winding device 1 brings the label roll paper 2 ejected from the ejection port of the printer 3 into contact with the tension bar 4 that is movable in the up-down direction, and winds it into a roll shape with the winding roller 6 via the rotatable idle roller 5. Also, the winding device 1 has the margin winding part 8 wind the marginal portion peeled off the label roll paper 2 by the peeling bar 7. In the carrying path in FIG. 1, the label roll paper is carried such that the base sheet is low and the label and the marginal portion are up. The tension bar is in contact with the label and the marginal portion, but is not contact with the base sheet.

The tension bar 4 is configured movable in the up-down direction indicated with an arrow B in the figure, and also a rotatable roller is attached. This tension bar 4 is disposed between the ejection port of the printer 3 and the idle roller 5, and is arranged so as to contact with the upper face of the label roll paper 2 ejected from the ejection port of the printer 3.

The idle roller 5 is disposed in the downstream of the tension bar 4 in the label roll paper carrying direction, contacts with the lower face of the label roll paper 2, and guides the label roll paper 2. A high friction member is wound on the surface of the idle roller 5, a torque limiter is provided on the rotation shaft or the gear coupling part of the idle roller 5 so as to allow placing a constant load on the rotation of the idle roller 5. Therefore, it becomes possible to add a constant tension to the label roll paper 2 between the idle roller 5 and the winding roller 6, and homogenize the winding hardness of the label roll paper 2 wound by the winding roller 6.

The winding roller 6 as a first roller is disposed in the downstream of the idle roller 5 in the label roll paper carrying direction, and winds the label roll paper 2 ejected from the ejection port of the printer 3 into a roll shape via the tension bar 4 and the idle roller 5. The winding roller 6 rotates in a direction indicated with an arrow C in the figure by the drive of a winding roller motor 15 shown in FIG. 3 as a drive source transmitted by a gear coupling part, and winds the label roll paper 2 into a roll shape.

The peeling bar 7 is a rotatable bar disposed in the downstream side of the contact part between the idle roller 5 and the label roll paper 2 in the label roll paper carrying direction. The peeling bar 7 peels the marginal portion of the label roll paper 2 off the base sheet, and rotates accompanying the marginal portion while the marginal portion is running on the surface of the peeling bar 7.

The margin winding part 8 winds the marginal portion peeled off the label roll paper 2 by the peeling bar 7 into a roll shape. The margin winding part 8 rotates in a direction indicated with an arrow D in the figure by the drive of a winding roller motor as a drive source, and winds the marginal portion peeled off the label roll paper 2.

The tension bar guide 9 guides the tension bar 4 slidably in the up-down direction.

The tension bar 4 that is movable in the up-down direction guided by the tension bar guide 9 generates slack of the label roll paper 2 between the printer 3 and the winding roller 6, and generates winding timing for the label roll paper 2 and the marginal portion. Also, the tension bar 4 is placed on the upper face of the label roll paper 2 and adds an appropriate tension to the label roll paper 2 by its self weight.

The multiple tension bar sensors 10 are placed within a range where the tension bar 4 of the tension bar guide 9 can move, and detect the position of the tension bar 4. When the tension bar 4 positioned at the lowest is detected by the tension bar sensors 10, winding of the label roll paper 2 by the winding roller 6 and winding of the marginal portion by the margin winding part 8 are started, and when the tension bar 4 positioned at the highest is detected by the tension bar sensors 10, winding of the label roll paper 2 by the winding roller 6 and winding of the marginal portion by the margin winding part 8 are stopped.

Figure 2:
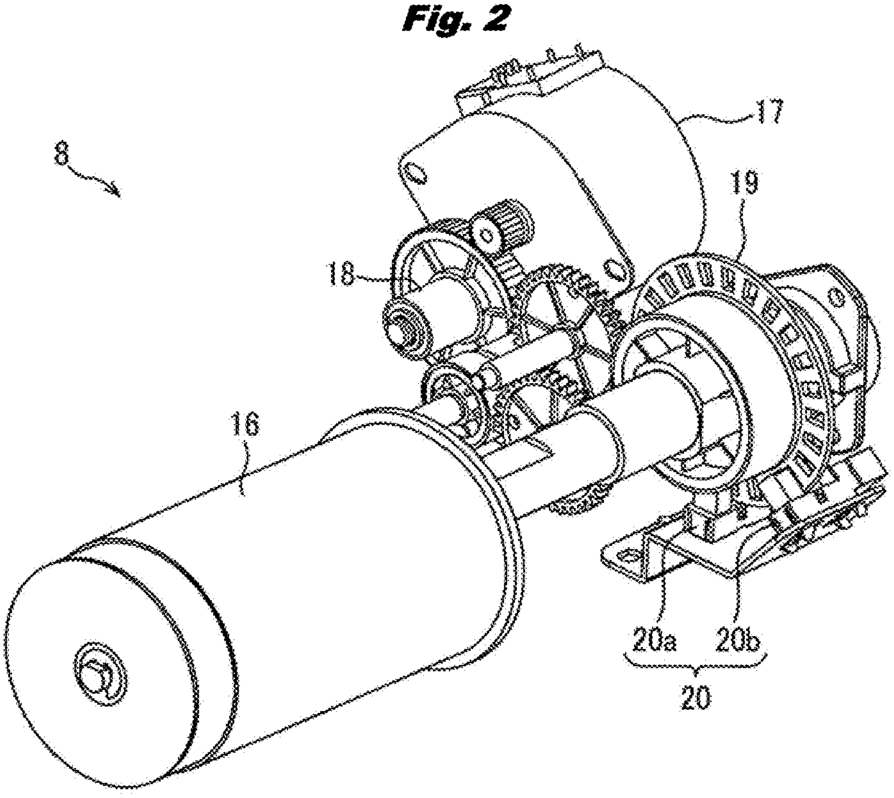
FIG. 2 is a perspective view showing the configuration of a margin winding part in the first embodiment.

FIG. 2 is a perspective view showing the configuration of the margin winding part in the first embodiment.

In FIG. 2, the margin winding part 8 comprises a margin winding roller 16, a margin winding roller motor 17, a torque limiter 18, a slit plate 19, and slit sensors 20.

The margin winding roller 16 as a second roller is a roller that winds the marginal portion peeled off the label roll paper.

The margin winding roller motor 17 as a drive means is a motor that drives the margin winding roller 16, and its drive is transmitted by the gear coupling part to the rotation shaft of the margin winding roller 16 and rotates the margin winding roller 16.

The torque limiter 18 as a drive transmission control means is provided on the gear coupling part between the margin winding roller 16 and the margin winding roller motor 17 to prevent the drive of the roller motor 17 from being transmitted to the margin winding roller 16 when a load above a prescribed level is placed on the margin winding roller 16. Because the torque limiter 18 allows the drive of the margin winding roller motor 17 to slip without being transmitted to the margin winding roller 16 when a load above a certain level is placed on the margin winding roller 16, it becomes possible to wind the marginal portion by the margin winding roller 16 while maintaining a constant tension added to the marginal portion to be wound.

In this manner, the torque limiter 18 performs a control so that when a load below the prescribed level is placed on the margin winding roller 16, the drive of the margin winding roller motor 17 is transmitted to the margin winding roller 16, and when a load above the prescribed level is placed on the margin winding roller 16, the drive of the margin winding roller motor 17 is cut off so as not to be transmitted to the margin winding roller 16.

The slit plate 19 is a disk-shaped part that is attached to the rotation shaft of the margin winding roller 16 and rotates together with the rotation of the rotation shaft of the margin winding roller 16. The slit plate 19 has penetrating holes formed keeping constant intervals along the circumferential direction.

The slit sensors 20 (20*a* and 20*b*) as a detection means are transmission-type optical sensors that detect the rotation state such as the rotation, stop, and rotation speed of the rotation shaft of the slit plate 19, that is the margin winding roller 16, by detecting the penetrating holes of the rotating slit plate 19. Each of the slit sensors 20 (20*a* and 20*b*) has an emitting part and a receiving part disposed opposing each other across the slit plate 19, and detects the rotation state of the slit plate 19 by detecting the penetrating holes of the rotating slit plate 19. The slit sensor 20*a* and the slit sensor 20*b* are disposed apart from each other by 90 degrees in phase to allow detecting the rotation direction of the margin winding roller 16 based on their respective output signals.

Figure 3:
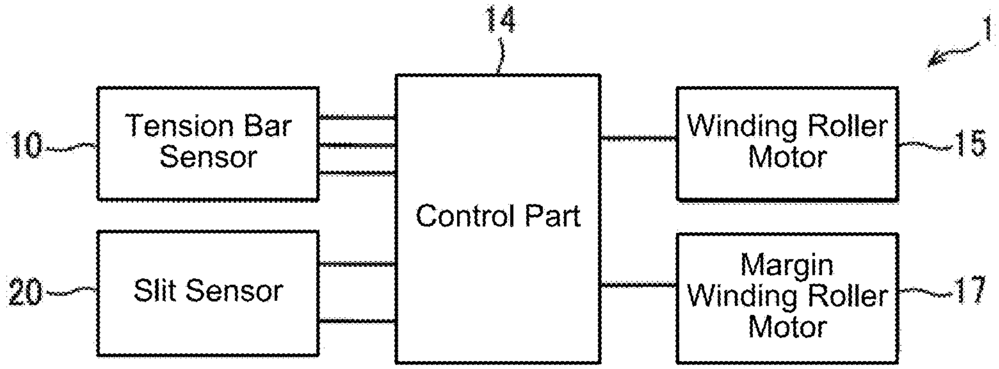
FIG. 3 is a block diagram showing the control configuration of the winding device in the first embodiment.

FIG. 3 is a block diagram showing the control configuration of the winding device in the first embodiment.

In FIG. 3, the winding device 1 comprises a control part 14, the tension bar sensors 10, the slit sensors 20, the winding roller motor 15, and the margin winding roller motor 17.

The control part 14 is provided with a control means such as a CPU (Central Processing Unit) and controls the whole operation of the winding device 1 based on a control program stored in a memory part such as memory.

The control part 14 is connected to the tension bar sensors 10 and the slit sensors 20 and can take the output signals of the tension bar sensors 10 and the slit sensors 20 as the input.

Also, the control part 14 is connected to the winding roller motor 15 and the margin winding roller motor 17 and can control driving and stopping of their rotations by outputting control signals to the winding roller motor 15 and the margin winding roller motor 17.

In this embodiment, the control part 14 detects a cutoff of the marginal portion wound on the margin winding roller 16 based on the rotation of the margin winding roller 16 shown in FIG. 2 detected by the slit sensors 20.

Actions of the above-mentioned configuration are explained.

First of all, the winding operations of the label roll paper and the marginal portion performed by the winding device are explained referring to FIGS. 1, 2, and 3.

First of all, upon detecting that the tension bar 4 is at the lowest level by the tension bar sensors 10, the control part 14 rotates the winding roller motor 15 connected to the rotation shaft or the gear coupling part of the winding roller 6 at a faster speed than the ejection speed of the label roll paper 2 ejected from the printer 3, and winds the label roll paper 2. During this winding operation, the label roll paper 2 pushes the tension bar 4 upwards.

Upon detecting by the tension bar sensors 10 that the tension bar 4 pushed upwards has reached the highest level, the control part 14 stops driving the winding roller motor 15 to stop winding the label roll paper 2. Note that the winding roller motor 15 retains the stopped position.

At this time, because the label roll paper 2 continues to be ejected from the printer 3 even if the driving of the winding roller motor 15 is stopped, the tension bar 4 placed on the upper face of the label roll paper 2 gradually descends by its self weight.

Upon detecting that the tension bar 4 is at the lowest level by the tension bar sensors 10 again, the control part 14 rotates the winding roller motor 15 to start an operation of winding the label roll paper 2.

On the other hand, the control part 14 starts driving the margin winding roller motor 17 at the same time with or earlier than starting driving the winding roller motor 15 to wind the marginal portion by the margin winding part 8. At this time, the control part 14 drives it at a faster rotation speed than the maximum speed of the winding roller motor 15 (a faster linear speed than the linear speed at the maximum diameter of the label roll paper 2 wound on the winding roller 6).

Because the margin winding part 8 comprises the torque limiter 18, if the prescribed load is exceeded, the margin winding roller 16 slips, and the linear speed of the marginal portion wound by the margin winding roller 16 becomes the same as the linear speed of the label roll paper 2 wound by the winding roller 6.

Figure 4:
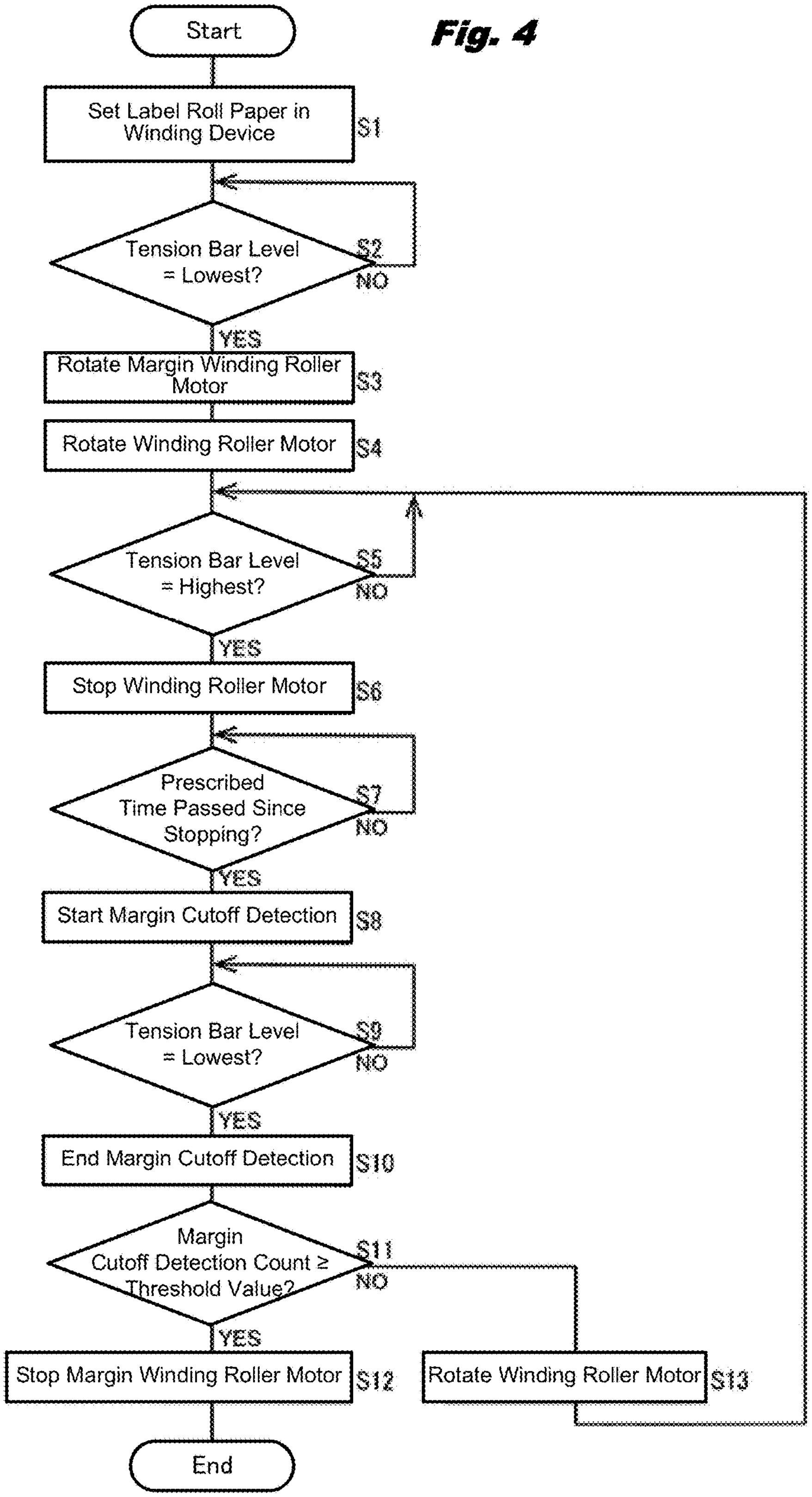
FIG. 4 is a flow chart showing the flow of a margin cutoff detection process in the first embodiment.
Figure 5:
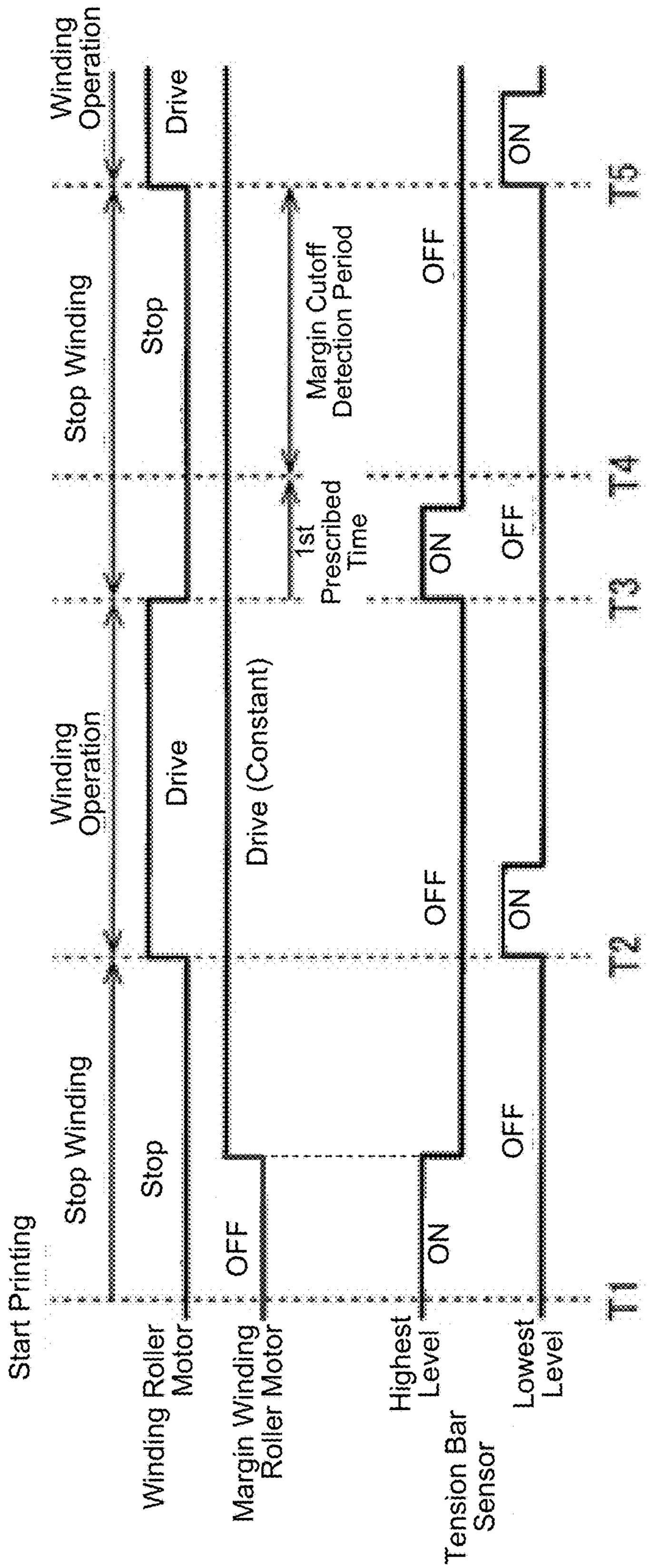
FIG. 5 is a time chart for margin cutoff detection in the first embodiment.

Next, a margin cutoff detection process performed by the winding device is explained referring to FIGS. 1, 2, 3, and 5 according to steps indicated with S in a flow chart in FIG. 4 showing the flow of the margin cutoff detection process in the first embodiment. Note that FIG. 5 is a time chart for the margin cutoff detection in the first embodiment.

S1: In order to wind the label roll paper 2 by the winding roller 6, a user has a prescribed amount of the label roll paper 2 ejected from the printer 3, has the label roll paper 2 go through the tension bar 4 and the idle roller 5, and winds its leading edge on the winding roller 6 of the winding device 1 to set it into a state allowing the winding operation.

S2: Once the printer 3 starts printing (T1 shown in FIG. 5), the printed label roll paper 2 is ejected from the printer 3, and the tension bar 4 placed on the upper face of the label roll paper 2 starts descending by its self weight. In order to detect the lowest position of the tension bar 4 that is the condition to start winding the label roll paper 2, the control part 14 monitors the position of the tension bar 4 by the tension bar sensors 10.

The control part 14 judges whether the tension bar 4 has reached the lowest level by the tension bar sensors 10, and upon judging that it has reached the lowest level, changes the process over to S3.

S3: Upon judging that the tension bar 4 has reached the lowest level, the control part 14 rotationally drives the margin winding roller motor 17 to rotate the margin winding roller 16.

S4: Subsequently, the control part 14 rotationally drives the winding roller motor 15 (T2 shown in FIG. 5), rotates the winding roller 6, and starts winding the label roll paper 2.

S5: Because the control part 14 always keeps the winding speed of the winding roller 6 faster than the ejection speed of the label roll paper 2 from the printer 3, the tension bar 4 ascends by the wound label roll paper 2. In order to detect the highest position of the tension bar 4 that is the condition to stop winding the label roll paper 2, the control part 14 monitors the position of the tension bar 4 by the tension bar sensors 10.

The control part 14 judges by the tension bar sensors 10 whether the tension bar 4 has reached the highest level, and upon judging that it has reached the highest level, changes the process over to S6.

S6: Upon judging that the tension bar 4 has reached the highest level (T3 shown in FIG. 5), the control part 14 stops the winding roller motor 15 to stop the rotation of the winding roller 6. Note that at this time the control part 14 continues driving the margin winding roller motor 17 to continue rotating the margin winding roller 16.

Because the printed label roll paper 2 continues to be ejected from the printer 3 even if the rotation of the winding roller 6 is stopped, the tension bar 4 placed on the upper face of the label roll paper 2 starts descending by its self weight.

S7: Upon stopping the rotation of the winding roller 6, the control part 14 performs margin cutoff detection to detect whether the marginal portion is cut off. Because the margin cutoff detection is difficult immediately after stopping the winding roller motor 15, the control part 14 stands by until first prescribed time passes since stopping the winding roller motor 15, and performs the margin cutoff detection after the first prescribed time has passed.

Considering the case where slack has occurred to the marginal portion peeled off the label roll paper 2 immediately after the winding roller motor 15 is stopped, the first prescribed time is time until the slack is dissolved on the margin winding roller 16 by the continued driving of the margin winding roller motor 17. The time is determined with considerations of the sheet carrying speed or the interval between rollers 7 and 8. When the carrying speed is around 150 mm/s, the actual time may be around 0.2 seconds.

Figure 6A:
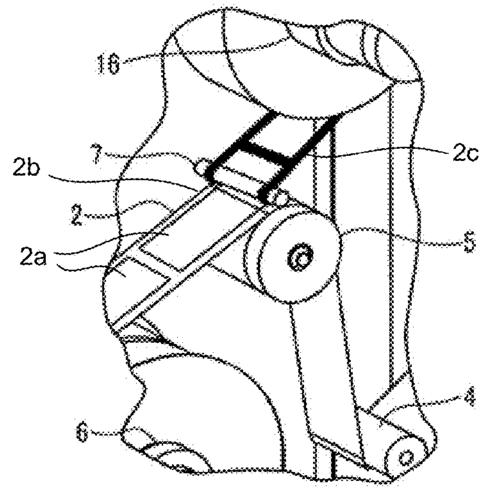
FIGS. 6A and 6B are explanatory diagrams for a margin slack occurrence in the first embodiment.

As shown in FIG. 6A, if no slack occurs to the marginal portion peeled off the label roll paper 2 immediately after the winding roller motor 15 is stopped, the marginal portion comes into a state of contacting with the peeling bar 7. In this state, although the margin winding roller motor 17 is driven, by the torque limiter 18 shown in FIG. 2 the margin winding roller 16 is in a state of slipping and having stopped rotating.

Figure 6B:
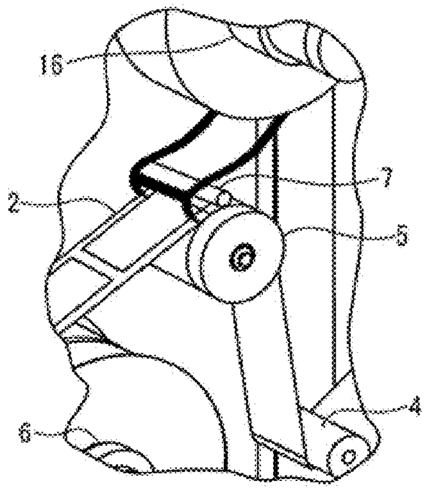

On the other hand, as shown in FIG. 6B, if slack occurs to the marginal portion peeled off the label roll paper 2 immediately after the winding roller motor 15 is stopped, the marginal portion comes into a state of being away from the peeling bar 7. In this state, because the margin winding roller motor 17 is driven, the margin winding roller 16 remains in a state of rotating and winding the marginal portion until the slack of the marginal portion disappears.

In this manner, until the above-mentioned first prescribed time passes, in spite of being in a state where the marginal portion is not cut off, there is a possibility that the margin winding roller 16 keeps rotating until the slack of the marginal portion is dissolved, and that a margin cutoff is mistakenly detected. Therefore, until this first prescribed time passes, no margin cutoff detection is performed.

S8: Upon detecting the passage of first prescribed time, the control part 14 starts counting the number of changes in the outputs (changes between ON signal and OFF signal) of the slit sensors 20 (T4 shown in FIG. 5), starting margin cutoff detection. In this manner, the control part 14 counts the number of changes in the outputs of the slit sensors 20 to detect the amount of rotation of the margin winding roller 16 to which the slit plate 19 is attached.

S9: In order to detect the lowest position of the tension bar 4 that is the condition to start winding the label roll paper 2, the control part 14 monitors the position of the tension bar 4 by the tension bar sensors 10.

The control part 14 judges whether the tension bar 4 has reached the lowest level by the tension bar sensors 10, and upon judging that it has reached the lowest level, changes the process over to S10.

S10: Upon judging that the tension bar 4 has reached the lowest level, the control part 14 stops counting the number of changes in the outputs of the slit sensors 20, ending the margin cutoff detection (T5 shown in FIG. 5).

S11: The control part 14 compares the counted number of changes in the outputs of the slit sensors 20 (margin cutoff detection count) and a threshold value for margin cutoff discernment. If it judges that the number of changes in the outputs of the slit sensors 20 is above the threshold value, it judges that a margin cutoff has occurred and changes the process over to S12, and if it judges that it is below the threshold value, it judges that no margin cutoff has occurred and changes the process over to S13.

Figure 7A:
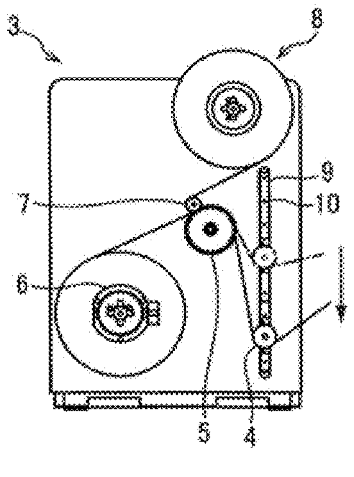
FIGS. 7A and 7B are explanatory diagrams for the case where no margin cutoff has occurred in the first embodiment.
Figure 7B:
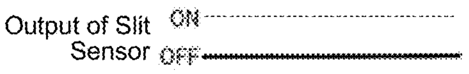

If there is no margin cutoff occurrence, as shown in FIG. 7A, the winding roller motor 15 and the winding roller 6 are in a state of having stopped rotating, and although the margin winding roller motor 17 is driven, by the torque limiter 18 shown in FIG. 2, the margin winding roller 16 is in a state of slipping and having stopped rotating. Therefore, the outputs of the slit sensors 20 are in an unchanging state as shown in FIG. 7B.

Figure 8A:
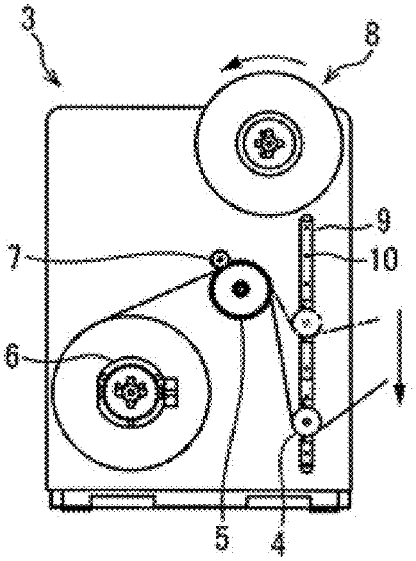
FIGS. 8A and 8B are explanatory diagrams for the case where a margin cutoff has occurred in the first embodiment.
Figure 8B:
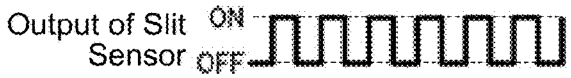

On the other hand, if there is a margin cutoff occurrence, as shown in FIG. 8A, the winding roller motor 15 and the winding roller 6 are in a state of having stopped rotating, and the margin winding roller motor 17 is driven, therefore the margin winding roller 16 is in a state of rotating at the maximum speed. Therefore, the outputs of the slit sensors 20 are in a changing state as shown in FIG. 8B.

Note that the threshold value for margin cutoff discernment is set to a value considering the fact that even if a margin cutoff occurs, it requires time for the rotation speed of the margin winding roller 16 to increase due to inertia if the marginal portion wound on the margin winding roller 16 has a large winding diameter and is heavy.

In this manner, if the rotation of the rotation shaft of the margin winding roller 16 is detected by the slit sensors 20 and the number of changes in the outputs of the slit sensors is above the threshold value in a state of having the winding operation of the winding roller 6 stopped and driving the margin winding roller 16 by the margin winding roller motor 17, the control part 14 judges that the marginal portion is cut off.

S12: Upon judging that the number of changes in the outputs of the slit sensors 20 is above the threshold value, the control part 14 judges that the margin winding roller 16 is rotating due to a margin cutoff occurrence, stops the margin winding roller motor 17 to stop the winding operation of the marginal portion, and ends this process.

S13: Upon judging that the number of changes in the outputs of the slit sensors 20 is below the threshold value, the control part 14 judges that no margin cutoff has occurred and rotationally drives the winding roller motor 15, rotates the winding roller 6, starts winding the label roll paper 2, and changes the process over to S5.

In this manner, the winding device 1 of this embodiment performs a margin cutoff detection process where it continues to drive rotationally the margin winding roller 16 that winds the marginal portion peeled off the label roll paper 2 even while winding the label roll paper 2 is stopped, detects by the outputs of the slit sensors 20 the rotation state whether the margin winding roller 16 is rotating, and if it judges that the margin winding roller 16 is rotating, detects that a margin cutoff has occurred.

Therefore, there is no need to modify the margin cutoff detection device according to the material or width of the marginal portion of the label roll paper, and the cutoff of the marginal portion can be detected without imposing any burden on the operator.

As explained above, in the first embodiment, the rotational drive of the margin winding roller that winds the marginal portion peeled off the label roll paper is continued even while winding of the label roll paper is stopped, the rotation state of the margin winding roller is detected by the sensors, and if it is judged that the margin winding roller is rotating, a margin cutoff occurrence is detected, thereby obtaining the effect that a cutoff of the marginal portion can be detected without imposing any burden on the operator.

Also, regardless of the material or width of the marginal portion, a margin cutoff occurrence can be detected, which allows notifying the operator or automatically stopping the winding device when a margin cutoff has occurred, thereby obtaining the effect to prevent incidences that decrease the work efficiency such as having to perform a margin winding work to wind up the marginal portion again because the label roll paper was wound up leaving the margin cutoff occurrence as it is.

Embodiment 2

Because the configuration of the winding device 1 in the second embodiment is the same as in the first embodiment mentioned above, the same codes are given and the explanation is omitted.

The actions of the second embodiment are explained.

Note that because the winding operations of the label roll paper and the marginal portion performed by the winding device are the same as in the first embodiment, their explanations are omitted.

Figure 9:
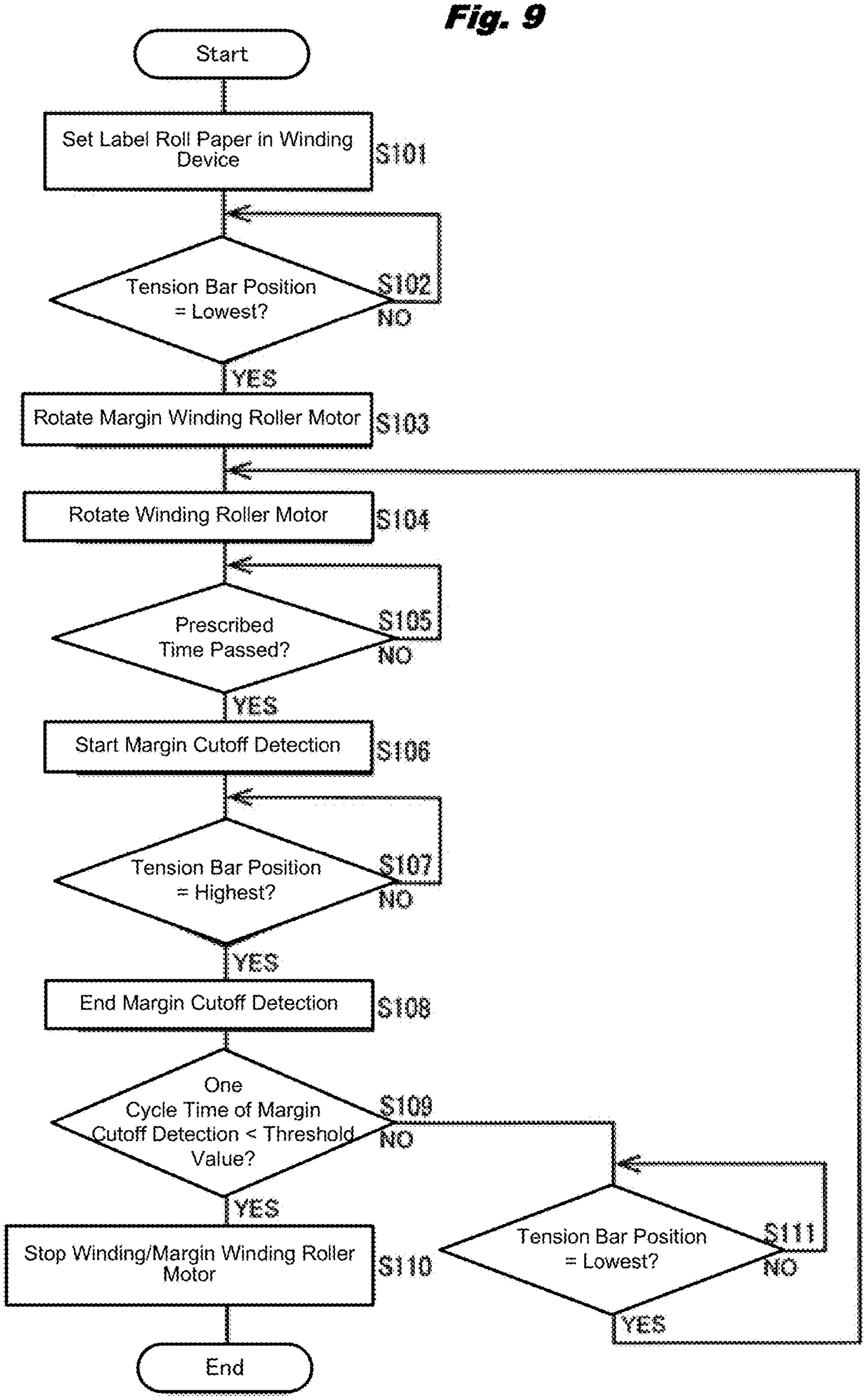
FIG. 9 is a flow chart showing the flow of a margin cutoff detection process in the second embodiment.
Figure 10:
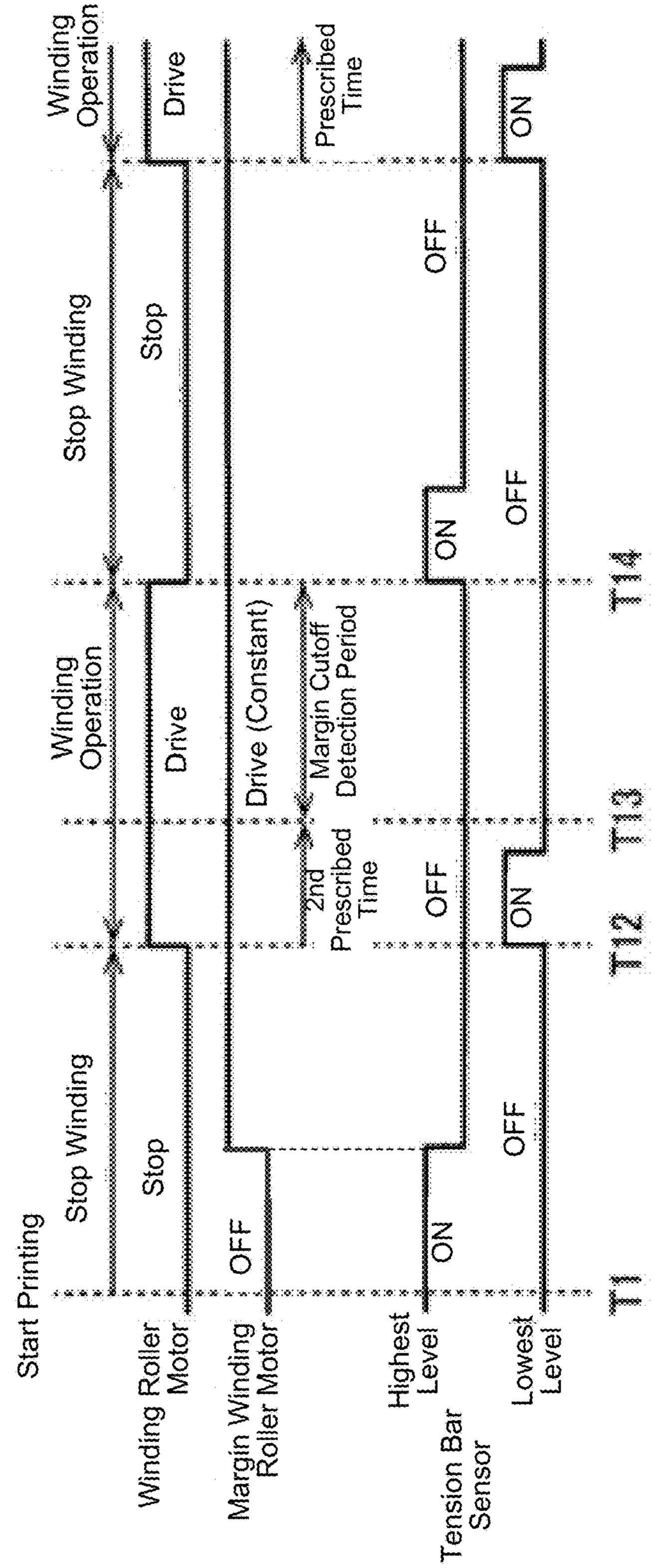
FIG. 10 is a time chart for margin cutoff detection in the second embodiment.

The margin cutoff detection process performed by the winding device is explained referring to FIGS. 1, 2, 3, and 10 according to steps indicated with S in a flow chart in FIG. 9 showing the flow of the margin cutoff detection process in the second embodiment. Note that FIG. 10 is a time chart for the margin cutoff detection in the second embodiment.

S101-S103: Because these are the same processes as S1-S3 shown in FIG. 4, their explanations are omitted.

S104: The control part 14 rotationally drives the winding roller motor 15 (T12 shown in FIG. 10), rotates the winding roller 6, and start winding the label roll paper 2.

S105: Because the control part 14 always sets the winding speed of the winding roller 6 faster than the ejection speed of the label roll paper 2 from the printer 3, the tension bar 4 ascends by the wound label roll paper 2.

Upon rotating the winding roller 6, the control part 14 performs margin cutoff detection to detect whether the marginal portion is cut off. Because the margin cutoff detection is difficult immediately after starting the rotation of the winding roller motor 15, the control part 14 stands by until second prescribed time passes since starting the rotation of the winding roller motor 15 and performs the margin cutoff detection after the second prescribed time has passed.

If the diameter or weight of the marginal portion wound by the margin winding roller 16 becomes large, even if a margin cutoff occurs, the increase in the rotation speed of the rotation shaft of the margin winding roller 16 becomes gradual. Therefore, the second prescribed time is time required for the rotation speed to increase to a prescribed rotation speed.

In this manner, until the above-mentioned second prescribed time passes, in spite of being in a state where the marginal portion is cut off, it is possible that the margin winding roller 16 does not come to have a speed above the prescribed rotation speed, and that the margin cutoff cannot be detected. Therefore, until this second prescribed time passes, no margin cutoff detection is performed.

S106: Upon detecting the passage of the second prescribed time, the control part 14 starts measuring time for one cycle of changes (e.g., the cycle of change from OFF signal to ON signal) in the outputs of the slit sensors 20 (T13 shown in FIG. 10), starting the margin cutoff detection. In this manner, the control part 14 measures the time for one cycle of changes in the outputs of the slit sensors 20 to detect the rotation speed of the margin winding roller 16 to which the slit plate 19 is attached.

S107: In order to detect the highest position of the tension bar 4 that is the condition to stop winding the label roll paper 2, the control part 14 monitors the position of the tension bar 4 by the tension bar sensors 10.

The control part 14 judges whether the tension bar 4 has reached the highest level by the tension bar sensors 10, and upon judging that it has reached the highest level, changes the process over to S108.

S108: Upon judging that the tension bar 4 has reached the highest level, the control part 14 stops measuring the time for one cycle of changes in the outputs of the slit sensors 20 to end the margin cutoff detection (T14 shown in FIG. 10). Herein, the one cycle of changes means a period during which the output signal of slit sensor turns from On to Off, then comes back to On again. See TA and TB in FIGS. 11B and 12B. The one cycle may be determined by a period during which the output signal turns from Off to On and to Off again.

Also, upon judging that the tension bar 4 has reached the highest level, the control part 14 stops the winding roller motor 15 to stop the rotation of the winding roller 6. Note that, at this time the control part 14 continues driving the margin winding roller motor 17 to continue rotating the margin winding roller 16.

Because the printed label roll paper 2 continues to be ejected from the printer 3 even after stopping the rotation of the winding roller 6, the tension bar 4 placed on the upper face of the label roll paper 2 starts descending by its self weight.

S109: The control part 14 compares the measured time for one cycle of changes in the outputs of the slit sensors 20 (one cycle time of margin cutoff detection) and the threshold value for the margin cutoff discernment. If it judges that the time for one cycle of changes in the outputs of the slit sensors 20 is below the threshold value, it judges that a margin cutoff has occurred and changes the process over to S110, and if it judges that it is above the threshold value, it judges that no margin cutoff has occurred and changes the process over to S111.

Figure 11A:
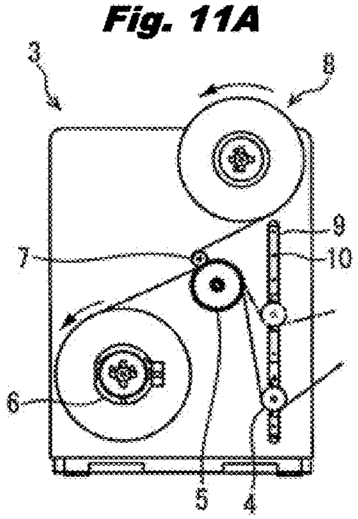
FIGS. 11A and 11B are explanatory diagrams for the case where no margin cutoff has occurred in the second embodiment.
Figure 11B:
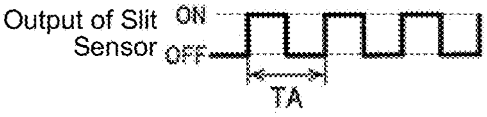

If no margin cutoff has occurred, as shown in FIG. 11A, the winding roller motor 15 and the winding roller 6 are in a rotating state, and the margin winding roller motor 17 is driven, therefore by the torque limiter 18 shown in FIG. 2 the rotation shaft of the margin winding roller 16 is in a slipping state, rotating at a rotation speed that gives the same linear speed as the winding roller 6. Therefore, as shown in FIG. 11B, in the outputs of the slit sensors 20, time TA for one cycle of changes in the outputs becomes above the threshold value.

Figure 12A:
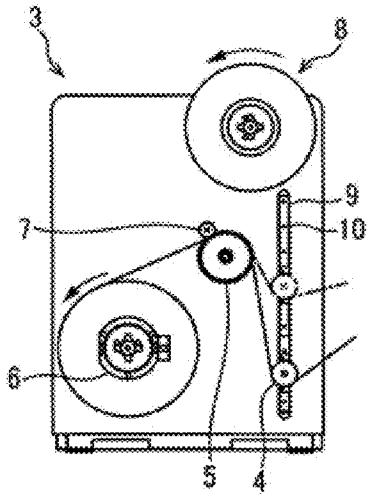
FIGS. 12A and 12B are explanatory diagrams for the case where a margin cutoff has occurred in the second embodiment.
Figure 12B:
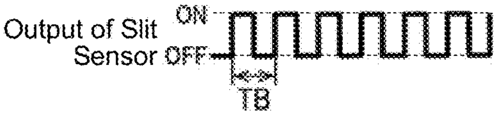

On the other hand, if a margin cutoff has occurred, as shown in FIG. 12A, the winding roller motor 15 and the winding roller 6 are in a rotating state, and the margin winding roller motor 17 is driven, therefore the rotation shaft of the margin winding roller 16 is in a state of rotating at the maximum speed. Therefore, as shown in FIG. 12B, in the outputs of the slit sensors 20, time TB for one cycle of changes in the outputs becomes below the threshold value.

Note that the threshold value for margin cutoff discernment is set to a value considering the fact that the rotation speed of the rotation shaft of the margin winding roller 16 changes by the rotation speed of the winding roller 6 and the winding diameter of the marginal portion wound up by the margin winding roller 16 in the case where no margin cutoff has occurred, and the rotation speed of the rotation shaft of the margin winding roller 16 in the case where a margin cutoff has occurred.

In this manner, during the winding operation of the winding roller 6 and in a state where the margin winding roller 16 is driven by the margin winding roller motor 17, if the rotation speed of the rotation shaft of the margin winding roller 16 detected by the slit sensors 20 exceeds the threshold value, the control part 14 judges that the marginal portion is cut off.

S110: Upon judging that the time for one cycle of changes in the outputs of the slit sensors 20 is below the threshold value, the control part 14 judges that the margin winding roller 16 is rotating at the maximum speed in an idle rotation state because a margin cutoff has occurred, stops the margin winding roller motor 17 to stop the winding operation of the marginal portion, and ends this process.

S111: Upon judging that the time for one cycle of changes in the outputs of the slit sensors 20 is above the threshold value, the control part 14 judges that no margin cutoff has occurred and monitors the position of the tension bar 4 by the tension bar sensors 10 in order to detect the lowest position of the tension bar 4 that is the condition to start winding the label roll paper 2.

The control part 14 judges by the tension bar sensors 10 whether the tension bar 4 has reached the lowest level, and upon judging that it has reached the lowest level, changes the process over to S104.

In this manner, the winding device 1 of this embodiment performs a margin cutoff detection process where it rotationally drives the margin winding roller 16 that winds the marginal portion peeled off the label roll paper 2 while winding the label roll paper 2, detects the rotation speed of the margin winding roller 16 based on the outputs of the slit sensors 20, and upon judging that the margin winding roller 16 is rotating at a faster rotation speed than the prescribed rotation speed, detects that a margin cutoff has occurred.

Therefore, there is no need to modify the margin cutoff detection device according to the material or width of the marginal portion of the label roll paper, and a cutoff of the marginal portion can be detected without imposing any burden on the operator.

As explained above, in the second embodiment, the margin winding roller that winds the marginal portion peeled off the label roll paper is rotationally driven while winding the label roll paper, the rotation speed of the margin winding roller is detected by the sensors, and upon judging that the margin winding roller is rotating at a faster rotation speed than the prescribed rotation speed, a margin cutoff occurrence is detected, thereby obtaining the effect that a cutoff of the marginal portion can be detected without imposing any burden on the operator.

Embodiment 3

Figure 13:
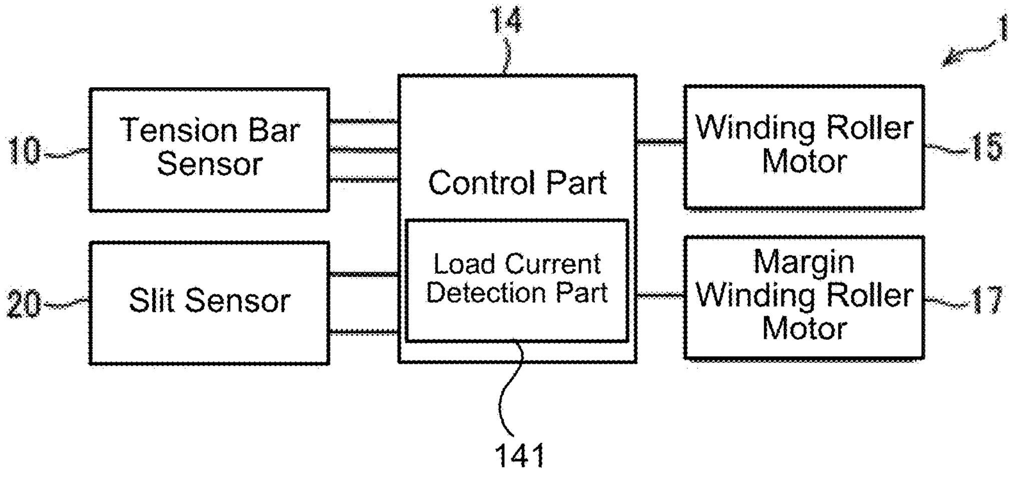
FIG. 13 is a block diagram showing the control configuration of a winding device in the third embodiment.

The configuration of the third embodiment is different from the configuration of the first embodiment in that the control part is provided with a load current detection part. The configuration of the third embodiment is explained based on a block diagram in FIG. 13 showing the control configuration of a winding device in the third embodiment. Note that the same parts as those in the first embodiment mentioned above are given the same codes, and their explanations are omitted.

In FIG. 13, the control part 14 of the winding device 1 is connected to the winding roller motor 15 and the margin winding roller motor 17 and can control their rotational drives and stops by outputting control signals to the winding roller motor 15 and the margin winding roller motor 17.

Also, the control part 14 is provided with the load current detection part 141 as a detection means that detects the rotation of the margin winding roller 16 shown in FIG. 2. This load current detection part 141 detects the rotation of the margin winding roller 16 shown in FIG. 2 by detecting a load current when the margin winding roller motor 17 is driven.

The margin winding roller motor 17 of this embodiment is a motor (e.g., a DC motor) whose load current varies according to the load, and the load current detection part 141 detects the load current value when the margin winding roller motor 17 is driven. If the load current value is above a threshold value, it detects that the margin winding roller 16 shown in FIG. 2 is stopped, and if the load current value is below the threshold value, it detects that the margin winding roller 16 shown in FIG. 2 is rotating.

Note that the winding device 1 of this embodiment may have a configuration without the slit sensors 20 provided.

Actions of the above-mentioned configuration are explained.

Note that because the winding operations of the label roll paper and the marginal portion performed by the winding device are the same as in the first embodiment, their explanations are omitted.

Figure 14:
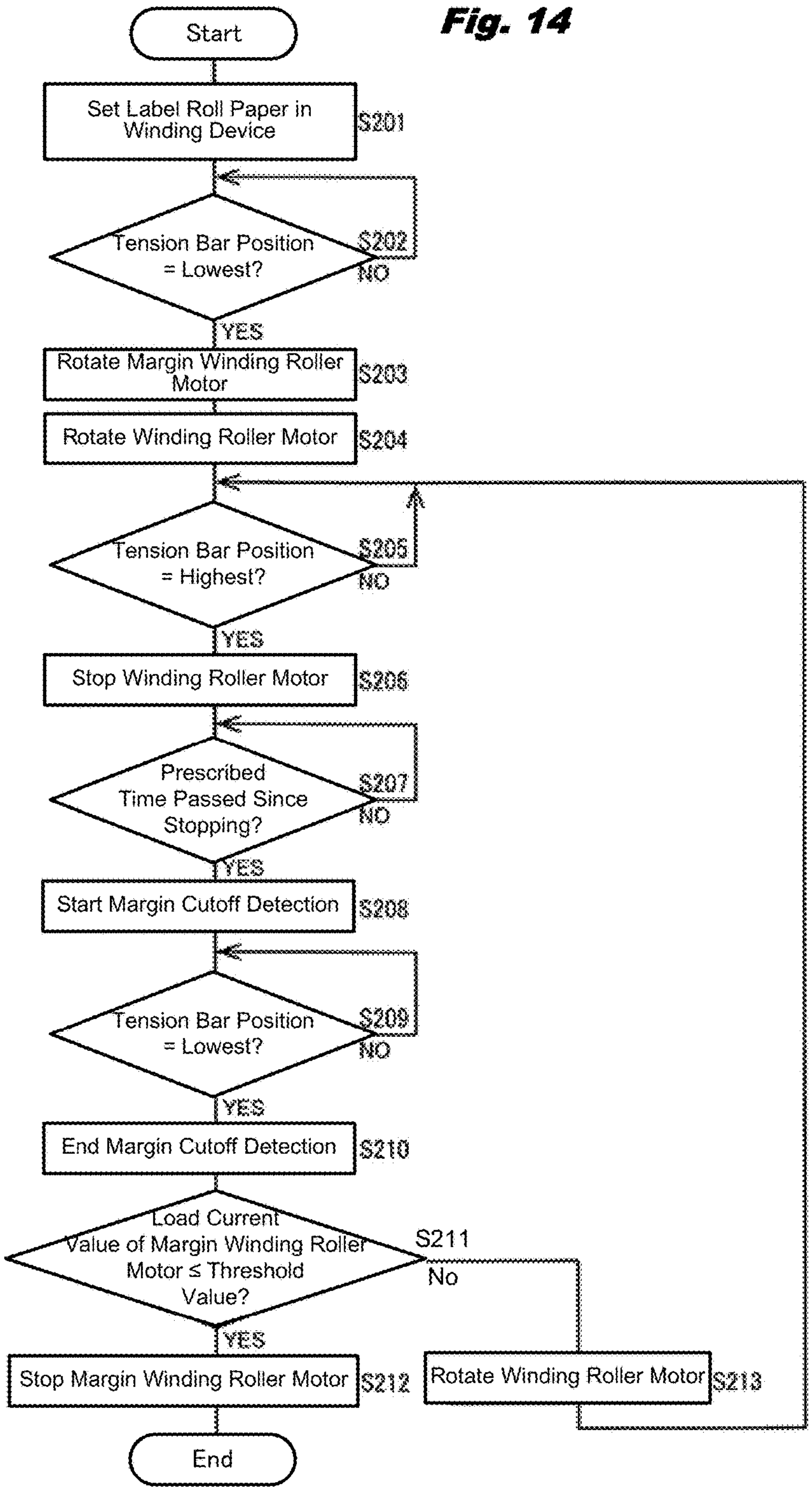
FIG. 14 is a flow chart showing the flow of a margin cutoff detection process in the third embodiment.
Figure 15:
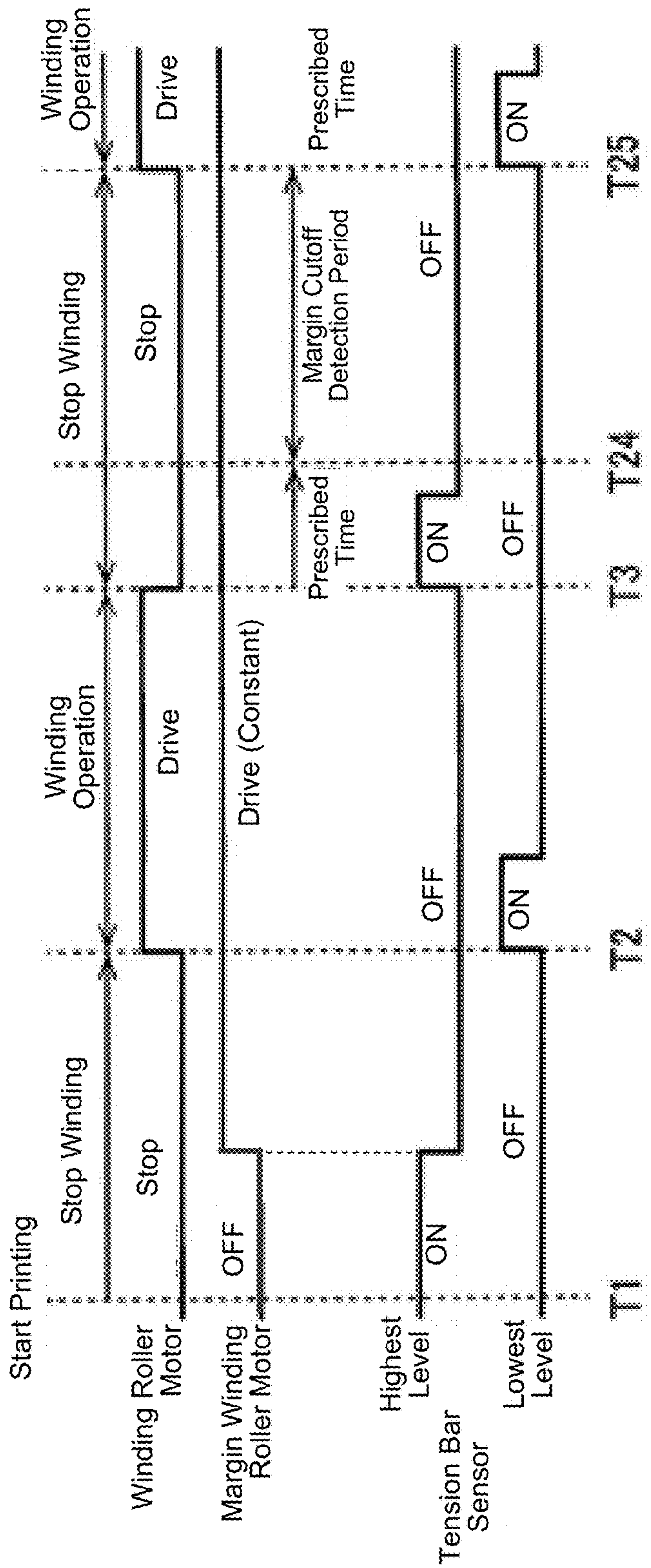
FIG. 15 is a time chart for margin cutoff detection in the third embodiment.

The margin cutoff detection process performed by the winding device is explained referring to FIGS. 1, 2, 13, and 15 according to steps indicated with S in a flow chart in FIG. 14 showing the flow of the margin cutoff detection process in the third embodiment. Note that FIG. 15 is a time chart for margin cutoff detection in the third embodiment.

S201-S207: Because these are the same processes as S1-S7 shown in FIG. 4, their explanations are omitted.

S208: Upon detecting the passage of the first prescribed time, the control part 14 starts monitoring the load current of the margin winding roller motor 17 by the load current detection part 141 (T24 shown in FIG. 15), starting the margin cutoff detection.

S209: In order to detect the lowest position of the tension bar 4 that is the condition to start winding the label roll paper 2, the control part 14 monitors the position of the tension bar 4 by the tension bar sensors 10.

The control part 14 judges by the tension bar sensors 10 whether the tension bar 4 has reached the lowest level, and upon judging that it has reached the lowest level, changes the process over to S210.

S210: Upon judging that the tension bar 4 has reached the lowest level, the control part 14 stops monitoring the load current of the margin winding roller motor 17 by the load current detection part 141, and ends the margin cutoff detection (T25 shown in FIG. 15).

S211: The control part 14 compares the load current value of the margin winding roller motor 17 detected by the load current detection part 141 and the current threshold value for margin cutoff discernment. If it judges that the load current value of the margin winding roller motor 17 is below the threshold value, it judges that a margin cutoff has occurred and changes the process over to S212, and if it judges that it is above the threshold value, it judges that no margin cutoff has occurred and changes the process over to S213.

Figure 16A:
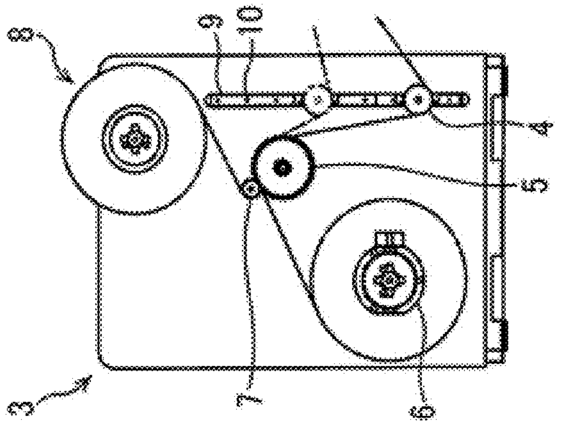
FIGS. 16A and 16B are explanatory diagrams for the case where no margin cutoff has occurred in the third embodiment.
Figure 16B:
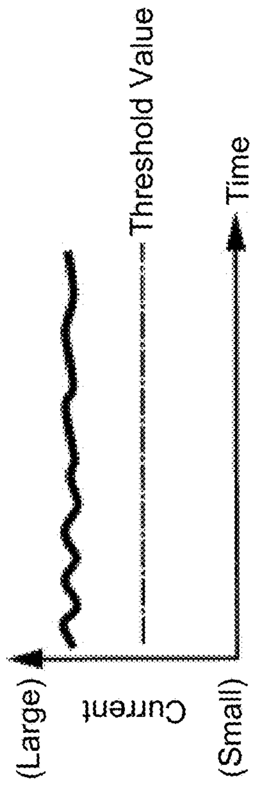

If no margin cutoff has occurred, as shown in FIG. 16A, the winding roller motor 15 and the winding roller 6 are in a state of having stopped rotating, and although the margin winding roller motor 17 is driven, by the torque limiter 18 shown in FIG. 2, the margin winding roller 16 is in a state of slipping and having stopped rotating. Therefore, because the toque of the torque limiter 18 is applied to the margin winding roller motor 17, as shown in FIG. 16B, the load current value becomes larger than the threshold value.

Figure 17B:
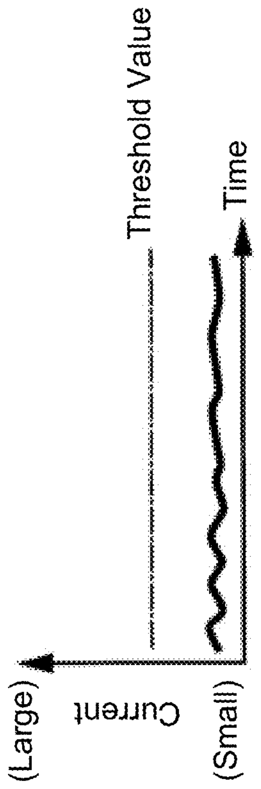
FIGS. 17A and 17B are explanatory diagrams for the case where a margin cutoff has occurred in the third embodiment.
Figure 17A:
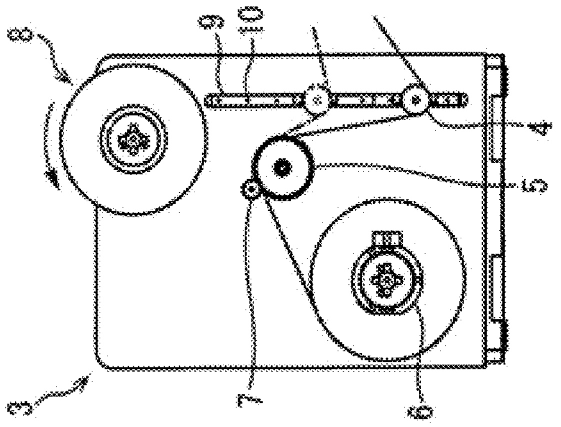

On the other hand, if a margin cutoff has occurred, as shown in FIG. 17A, the winding roller motor 15 and the winding roller 6 are in a state of having stopped rotating, and the margin winding roller motor 17 is driven, therefore the margin winding roller 16 is in a state of rotating (idling) at the maximum speed. Therefore, because the torque of the torque limiter 18 is not applied to the margin winding roller motor 17, as shown in FIG. 17B, the load current value becomes below the threshold value.

Note that the current threshold value for margin cutoff discernment is set to a value considering the fact that if the marginal portion wound up by the margin winding roller 16 has a large winding diameter and is heavy, even if a margin cutoff occurs, a load by its inertia is placed on the margin winding roller 16.

S212: Upon judging that the load current value of the margin winding roller motor 17 detected by the load current detection part 141 is below the threshold value, the control part 14 judges that the margin winding roller 16 is rotating because a margin cutoff has occurred, stops the margin winding roller motor 17 to stop the winding operation of the marginal portion, and ends this process.

S213: Upon judging that the load current value of the margin winding roller motor 17 detected by the load current detection part 14 is above the threshold value, the control part 14 judges that no margin cutoff has occurred, rotationally drives the winding roller motor 15, rotates the winding roller 6, starts winding the label roll paper 2, and changes the process over to S205.

In this manner, the winding device 1 of this embodiment performs a margin cutoff detection process where it continues to drive rotationally the margin winding roller 16 that winds the marginal portion peeled off the label roll paper 2 even while winding the label roll paper 2 is stopped, indirectly detects the rotation state whether the margin winding roller 16 is rotating based on the load current value for the load placed on the margin winding roller motor 17, and if it judges that the margin winding roller 16 is rotating, detects that a margin cutoff has occurred.

Therefore, there is no need to modify the margin cutoff detection device according to the material or width of the marginal portion of the label roll paper, and a cutoff of the marginal portion can be detected without imposing any burden on the operator.

As explained above, in the third embodiment, the rotational drive of the margin winding roller that winds the marginal portion peeled off the label roll paper is continued even while winding of the label roll paper is stopped, the rotation state of the rotation shaft of the margin winding roller is detected based on the load current value of the margin winding roller motor, and if it is judged that the margin winding roller is rotating, a margin cutoff occurrence is detected, thereby obtaining the effect that a cutoff of the marginal portion can be detected without imposing any burden on the operator.

What is claimed is:

1. A winding device, comprising:

a first roller that winds label roll paper, the label roll paper being composed with a continues base sheet, a plurality of labels and a marginal portion, the labels and the marginal portion, which surrounds the labels, being peelably attached on one side of the base sheet such that the labels and the marginal portion entirely covers the one side of the base sheet, the label roll paper being carried in a first carry direction by the first roller and wound on the first roller after the marginal portion is peeled off from the base sheet, a second roller that carries the marginal portion peeled off from the base sheet in a second carry direction and winds the marginal portion, a drive part that generates a driving force for the second roller to rotate, a drive transmission control part that is configured to be between the drive part and the second roller such that the driving force is transmitted to the second roller from the driving part, stop transmitting the driving force to the second roller if a load placed on the second roller exceeds a prescribed load, apply a predetermined tension to the marginal portion unless a cutoff the marginal portion occurs, a detection part that detects a rotation of the second roller, and a control part that determines the cutoff of the marginal portion based on the rotation of the second roller detected by the detection part, wherein the control part determines whether or not the cutoff occurs while the drive part generates the driving force.

2. The winding device according to claim 1, wherein when the cutoff of the marginal portion is detected by the control part, the control part stops the rotation of the second roller.

3. The winding device according to claim 1, further comprising:

one of a speaker and a display, wherein when the cutoff of the marginal portion is detected by the control part, the control part either sounds alarms through the speaker or displays an alarm on the display.

4. The winding device according to claim 1, wherein the second roller includes a rotation shaft around which the second roller rotates, the detection part is a sensor to monitor a rotation of the rotation shaft of the second roller, and the control part determines the cutoff of the marginal portion when the rotation shaft of the second roller is detected rotating in a state where the first roller is stopped and the second roller is driven by the drive part.

5. The winding device according to claim 1, wherein the detection part is a sensor to monitor a rotation speed of the second roller, and the control part determines the cutoff of the marginal portion if the rotation speed of the second roller monitored by the detection part exceeds a threshold value in a state where the second roller is driven by the drive part and the first roller is driven to wind the base sheet.

6. The winding device according to claim 1, wherein the detection part is a sensor to monitor a load current of the second roller, the load current being defined as a current that is applied to the drive part when the drive part rotates the second roller, and the control part determines the cutoff of the marginal portion if the load current of the second roller monitored by the detection part does not exceed a threshold value in a state where the second roller is driven by the drive part and the first roller is driven to wind the base sheet.

7. The winding device according to claim 4, wherein the control part is configured to stop a rotation of the first roller and to measure time since the first roller stops, and initiates to determine the cutoff of the marginal portion after the time measured by the control part exceeds prescribed time.

8. The winding device according to claim 6, wherein the control part is configured to stop a rotation of the first roller and to measure time since the first roller stops, and initiates to determine the cutoff of the marginal portion after the time measured by the control part exceeds prescribed time.

9. The winding device according to claim 5, wherein the control part is configured to stop a rotation of the first roller and to measure time since the first roller stops, and initiates to determine the cutoff of the marginal portion after the time measured by the control part exceeds prescribed time.

10. The winding device according to claim 1, wherein the drive transmission control part is a torque limiter provided on a coupling part between the drive part and the rotation shaft of the second roller, the torque limiter functioning not to transmit the driving force to the second roller when a torque applied to the coupling part exceeds a threshold value.

11. A cutoff detection method for label roll paper using a winding device, the winding device comprising:

a first roller that winds label roll paper, the label roll paper being composed with a continues base sheet, a plurality of labels and a marginal portion, the labels and the marginal portion, which surrounds the labels, being peelably attached on one side of the base sheet such that the labels and the marginal portion entirely covers the one side of the base sheet, the label roll paper being carried in a first carry direction by the first roller and wound on the first roller after the marginal portion is peeled off from the base sheet, a second roller that carries the marginal portion peeled off from the base sheet in a second carry direction and winds the marginal portion, a drive part that generates a driving force, a control part that controls rotations of the first and second rollers, the second roller being driven by the driving force, a drive transmission control part that is configured to transmit the driving force to the second roller if a load placed on the second roller caused by the driving force is equal to or less than a prescribed load, and to stop transmitting the driving force to the second roller if the load placed on the second roller exceeds the prescribed load, and to apply a predetermined tension to the marginal portion unless a cutoff of the marginal portion occurs, and a detection part that detects a rotation status of the second roller, the cutoff detection method, comprising:

rotating the first and second rollers;

stopping a rotation of the first roller when a predetermined tension of the label roll paper is detected;

waiting for a predetermined period;

monitoring the status of the second roller in a state where the driving force is generated by the driving part but the driving force is not transmitted to the second roller due to the drive transmission control part, and determining that there is the cutoff of the marginal portion only if a torque, which is equal to or less than a predetermined load torque preset by the drive transmission control part, is present at the second roller in a direction opposite to the second carry direction; and causing the drive part not to generate the driving force when the cutoff is determined, or continuing to cause the drive part to generate the driving force when the cutoff is not determined.

12. The cutoff detection method of claim 11, further comprising measuring time since the first roller stops, wherein the monitoring the status of the second roller is initiated after the measured time exceeds prescribed time.

13. The winding device according to claim 1, further comprising:

a peeling part for peeling the marginal portion off the base sheet, is positioned at an upstream side from the first roller in the first direction and an upstream side from the second roller in the second direction, wherein the peeling part is composed with an idle roller to rotate and a peeling bar having a circular peripheral, the idle roller and the peeling bar tightly contact each other, and the label roll paper running through therebetween, the idle roller is arranged to face the base sheet and the peeling bar is arranged to face the marginal portion and the labels such that the first carry direction is directed to the first roller and the second carry direction is directed to the second roller after the label roll paper runs through the peeling part.

14. The winding device according to claim 13, wherein:

the idle roller has an outer peripheral of which a friction coefficient is greater than that of the circular peripheral of the peeling bar.

* * * * *